(12) United States Patent
Pratt et al.

(10) Patent No.: US 10,804,952 B2
(45) Date of Patent: Oct. 13, 2020

(54) ENHANCED COSITE TRANSMITTER-RECEIVER ISOLATION

(71) Applicant: University of Notre Dame du Lac, Notre Dame, IN (US)

(72) Inventors: Thomas G. Pratt, Niles, MI (US); Robert Daniel Kossler, South Bend, IN (US)

(73) Assignee: UNIVERSITY OF NOTRE DAME DU LAC, South Bend, IN (US)

( * ) Notice: Subject to any disclaimer, the term of this patent is extended or adjusted under 35 U.S.C. 154(b) by 0 days.

(21) Appl. No.: 15/485,186

(22) Filed: Apr. 11, 2017

(65) Prior Publication Data
US 2017/0353210 A1    Dec. 7, 2017

Related U.S. Application Data

(60) Provisional application No. 62/320,658, filed on Apr. 11, 2016.

(51) Int. Cl.
| | |
|---|---|
| *H04L 25/02* | (2006.01) |
| *H04B 7/06* | (2006.01) |
| *H04B 1/44* | (2006.01) |
| *H04L 1/00* | (2006.01) |

(52) U.S. Cl.
CPC ............ *H04B 1/44* (2013.01); *H04B 7/0617* (2013.01); *H04B 7/0626* (2013.01); *H04L 1/00* (2013.01); *H04L 25/0238* (2013.01); *H04L 25/024* (2013.01); *Y02D 70/166* (2018.01); *Y02D 70/444* (2018.01)

(58) Field of Classification Search
None
See application file for complete search history.

(56) References Cited

U.S. PATENT DOCUMENTS

| | | |
|---|---|---|
| 6,608,587 B1 | 8/2003 | Sparrow et al. |
| 7,136,627 B2 | 11/2006 | Hämäläinen et al. |
| 9,325,436 B2 | 4/2016 | Pratt et al. |
| 2003/0043768 A1 | 3/2003 | Chang et al. |

(Continued)

OTHER PUBLICATIONS

Born et al., "Principles of Optics: Electromagnetic Theory of Propagation, Interference and Diffraction of Light", 7th Ed., Cambridge University, 1999, pp. 31.

(Continued)

*Primary Examiner* — David Bilodeau
(74) *Attorney, Agent, or Firm* — Knobbe, Martens, Olson & Bear, LLP (57) ABSTRACT

Systems and methods for improving isolation between a cosite transmitter-receiver system. The transmitter may send a first plurality of transmit signals from multiple transmit ports. The first plurality of transmit signals may be related to one another by a first set of complex weights. The receiver may detect channel-impaired versions of the first plurality of transmit signals at one or more receive ports. The receiver may analyze channel-impaired versions of the first plurality of transmit signals to estimate channel state information. The transmitter may use the channel state information to determine a second set of complex weights which will reduce the power received at one or more ports of the receiver when applied to a second plurality of transmit signals. The second set of complex weights may vary with frequency.

20 Claims, 7 Drawing Sheets

(56) References Cited

U.S. PATENT DOCUMENTS

| | | | |
|---|---|---|---|
| 2008/0170533 A1 | 7/2008 | Cyzs et al. | |
| 2011/0060956 A1* | 3/2011 | Goldsmith | H04B 7/024 714/746 |
| 2016/0337056 A1* | 11/2016 | Frenne | H04B 7/0695 |
| 2017/0054583 A1* | 2/2017 | Pratt | H04L 27/2621 |
| 2017/0338874 A1* | 11/2017 | Pratt | H04B 7/0617 |
| 2018/0175922 A1* | 6/2018 | Nishimori | H04B 7/0626 |

OTHER PUBLICATIONS

Chen et al., "Energy Efficiency of Linearly Precoded MIMO for Wireless Communications from Battery-Powered Transceivers," Submitted for Publication on IEEE Transactions on Aerospace and Electronic Systems, Jun. 17, 2014, pp. 29.

Chen et al., "Energy Efficiency of Space and Polarization MIMO Communications with Packet Erasures over Wireless Fading Channels," IEEE Transactions on Wireless Communications, 2014, pp. 17.

Chen et al., "Space-Polarization MIMO Testbed", in 2013 6th International Symposium on Resilient Control Systems (ISRCS), IEEE, 2013, pp. 128-133.

Compton, Jr., R.T., "The Tripole Antenna: An Adaptive Array with Full Polarization Flexibility," Technical Report 712684-6, Dec. 1980, pp. 39.

Compton, R., "On the Performance of a Polarization Sensitive Adaptive Array," IEEE Transactions on Antennas and Propagation, Sep. 1981, vol. AP-29, No. 5, pp. 718-725.

Costa et al., "A Novel Wideband MIMO Channel Model and Experimental Validation," IEEE Transactions on Antennas and Propagation, Feb. 2008, vol. 56, No. 2, pp. 550-562.

Cui et al., "Energy-Efficiency of MIMO and Cooperative MIMO Techniques in Sensor Networks", IEEE Journal on Selected Areas in Communications, vol. 22, No. 6, 2004, pp. 1089-1098.

Deng et al., "Performance of MIMO Systems with Combined Polarization Multiplexing and Transmit Diversity", 2005 IEEE 61st Vehicular Technology Conference, VTC 2005-Spring, vol. 2, pp. 869-873.

Deschamps, G.A., "Techniques for Handling Elliptically Polarized Waves with Special Reference to Antennas, Part II—Geometrical Representation of the Polarization of a Plane Electromagenetic Wave", Proceedings of the I.R.E., vol. 39, May 1951, pp. 540-544.

Forenza et al., "Pattern Diversity with Multi-mode Circular Patch Antennas in Clustered MIMO Channels," in 2005 IEEE Antennas and Propagation Society International Symposium, vol. 3, pp. 438-441.

Foschiniet et al., "On Limits of Wireless Communications in a Fading Environment when Using Multiple Antennas," Wireless Personal Communications, 1998, vol. 6, No. 3, pp. 311-335.

Hwang et al., "Signal Enhancement Through Polarization Adaptivity on Transmit in a Near-Field MIMO Environment," IEEE Antennas and Propagation Society International Symposium, 2005, vol. 2, pp. 4.

Jakes, William C., "Microwave Mobile Communications," Wiley-Interscience, IEEE, 1974, pp. 645. [Uploaded in 4 parts].

Kogon, Stephen Michel, "Adaptive Array Processing Techniques for Terrain Scattered Interference Mitigation", PhD Thesis, Georgia Institute of Technology, Dec. 1996, pp. 177.

Ohno et al., "Adaptive Transmission Power Control for MIMO Diversity Employing Polarization Diversity in OFDM Radio Access," 2007 International Symposium on Nonlinear Theory and its Applications NOLTA'07, Vancouver, Canada, Sep. 16-19, 2007, pp. 5.

Paulraj et al., "Introduction to Space-Time Wireless Communications", Cambridge University Press, 2003, pp. 33.

Pedersen et al., "A Stochastic Multiple-Input-Multiple-Output Radio Channel Model for Evaluation of Space-Time Coding Algorithms", Vehicular Technology Conference Fall 2000. IEEE VTS Fall VTC2000, 52nd Vehicular Technology Conference, Sep. 24-28, 2000, vol. 2, pp. 893-897.

Pratt et al., "Polarization-Based Zero Forcing with Channel Estimation", MILCOM 2011, Baltimore, MD, Nov. 2011, pp. 7.

Pratt et al., "Adaptive Polarization Transmission of OFDM Signals in a Channel with Polarization Mode Dispersion and Polarization Dependent Loss," IEEE Transactions on Wireless Communications, Jul. 2009, vol. 8, No. 7, pp. 3354-3359.

Pratt et al., Dual-Polarized Architectures for Sensing with Wireless Communications Signals, MILCOM 2008, ACT-7.1, San Diego, CA, Nov. 17, 2008, p. 1-6.

Pratt et al., Towards Efficient Spectrum Utilization with Polarization-Based Architectures, International Journal of Handheld Computing Research (IJHCR), Apr.-Jun. 2015, vol. 6, No. 2, pp. 14.

Pratt et al. "A Modified XPC Characterization for Polarimetric Channels," IEEE Transaction on Vehicular Technology, Sep. 2011, vol. 60, No. 7, pp. 2904-2913.

Smith, Glenn S., "A Direct Derivation of a Single-Antenna Reciprocity Relation for the Time Domain", IEEE Transactions on Antennas and Propagation, Jun. 2004, vol. 52, No. 6, pp. 1568-1577.

Stapor et al., "Optimal Receive Antenna Polarization in the Presence of Interference and Noise", IEEE Transactions on Antennas and Propagation, May 1995, vol. 43, No. 5, pp. 473-477.

Talebi et al., "Correlation-Based Multipath Modeling of Indoor Wideband Space-Polarization MIMO Channels in Presence of Specular Reflections", IEEE Transactions on Wireless Communication, 2015, pp. 1-24.

Talebi et al., "Model Order Selection for Complex Sinusoids in the Presence of Unknown Correlated Gaussian Noise," IEEE Transactions on Signal Processing, Apr. 1, 2015, vol. 63, No. 7, pp. 1664-1674.

Talebi et al., "Reference No. 15: Channel Sounding and Parameter Estimation for a Wideband Correlation-Based MIMO Model", IEEE Transactions on Wireless Communications, Feb. 2015, pp. 25-34.

Thomas et al., "Asynchronous Interference Suppression in Broadband Cyclic-Prefix Communications", IEEE 2003, p. 568-572.

Tse et al., "Fundamentals of Wireless Communication", Cambridge University Press, 2005, pp. 647.

Tse et al., "Linear Multiuser Receivers in Random Environments", IEEE Transactions on Information Theory, Jan. 2000, vol. 46, No. 1, pp. 171-188.

"Universal Mobile Telecommunications Systems (UMTS); Spatial Channel Model for Multiple Input Multiple Output (MIMO) Simulations (3GPP TR 25.996 version 6.1.0 Release 6)," ETSI TR 125 996 V6.1.0., Sep. 2003.

Vu et al., "MIMO Wireless Linear Precoding", IEEE Signal Processing Magazine, Sep. 2007, vol. 24, No. 5, pp. 86-105.

Walkenhorst et al., "Polarization-Based Interference Mitigation for OFDM Signals in channels with Polarization Mode Dispersion," MILCOM 08, MCS-12.2, San Diego, CA, Nov. 17, 2008, pp. 5.

Winters, J., "Optimum Combining in Digital Mobile Radio with Cochannel Interference", IEEE Journal on Selected Areas in Communications, Jul. 1984, vol. 2, No. 4, pp. 528-539.

Yu et al., "Modeling of Wideband MIMO Radio Channels Based on NLOS Indoor Measurements," IEEE Transactions on Vehicular Technology, May 2004, vol. 53, No. 3, pp. 655-665.

* cited by examiner

FIG. 7

# ENHANCED COSITE TRANSMITTER-RECEIVER ISOLATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, this application claims priority to U.S. Provisional Patent Application 62/320,658, filed Apr. 11, 2016, and entitled "COSITE TRANSMISSION FOR ANALOG RF ISOLATION," the entirety of which is incorporated herein by reference.

STATEMENT REGARDING FEDERALLY SPONSORED R&D

This invention was made with government support under Fund 202326 of the U.S. Office of Naval Research. The government has certain rights in the invention.

BACKGROUND

Field

This disclosure relates generally to techniques for improving isolation of one or more receiver antenna elements from transmissions by a cosite transmitter having one or more transmit antenna elements.

Description of the Related Art

When transmit and receive antennas are located in relatively close proximity, signals from the transmit antenna can couple into the receive antenna, leading to degraded receiver functionality for at least the duration of the transmit signal. For example, strong signals from the nearby transmitter can overwhelm the capability of the receiver's electronics (e.g., amplifiers, analog-to-digital converters, etc.) to detect weaker signals from remote sources. This cosite problem can be mitigated through various strategies to improve the isolation between the transmit and receive antennas.

Techniques for improving isolation of a cosite receiver antenna can include, for example, increasing the separation between the transmit and receive antennas, reducing antenna sidelobe gains, employing circulators, or employing digital suppression filters after analog-to-digital conversion. However, additional techniques for improving isolation in cosite transmitter-receiver systems are needed.

Another topic related to this disclosure is polarization. Polarization is a characteristic of electromagnetic or other transverse waves which specifies the direction in which the waves oscillate in a transverse plane orthogonal to the direction of propagation. This direction of oscillation can be thought of as being made up of two orthogonal components. If the two orthogonal polarization components of a wave oscillate in phase with one another, they collectively result in a wave that oscillates linearly (i.e., along a line in the transverse plane), with the relative amplitude between the components determining the orientation of the linear oscillation (e.g., vertical, horizontal, slant 45, etc.). If there is a phase difference between the oscillations of the two orthogonal polarization components, they collectively result in a wave whose oscillations follow an ellipse in the transverse plane. In the case where the phase difference is ±90°, and assuming the amplitudes of the orthogonal components are identical, then the two polarization components collectively result in a wave whose oscillations follow a circle in the transverse plane. A transmitter can control the polarization state of a wave by varying the phase difference and/or the relative amplitude between signals emitted from orthogonally polarized antenna elements.

Yet another topic related to this disclosure is beamforming. Beamforming is a technique used in multi-port transmitters to transmit signals with directional selectivity. For example, a transmitter can employ beamforming to transmit a signal in a selected direction preferentially over other directions. Beamforming is accomplished by introducing phase differences between signals emitted or received by spatially-separated antenna elements. The phasing can occur at radio frequencies (RF), such as in analog arrays, or digitally, such as in digital beam forming systems. These phase differences cause the waves of energy which carry the signals to combine constructively and destructively differently along different angles of transmission. In directions where the waves combine constructively with one another, the signal is stronger, whereas in directions where the waves combine destructively with one another, the signal is weaker. A transmitter can control the direction of heightened signal power and/or the shape of the beam by varying the phase differences and/or amplitude differences between signals emitted from spatially-separated antenna elements.

At the receiver, null steering (a technology that is similar to beamforming but with antenna nulls) may be used to reduce interference from a transmitter. However, if null steering is accomplished via digital signal processing, as in digital beamforming, it does not address the effect of radio frequency (RF) power levels on the receiver circuits. On the other hand, if null steering is accomplished at RF, it is unwieldy and difficult to apply effectively in environments with multipath coupling.

SUMMARY

Systems and methods for improving isolation between a cosite transmitter-receiver pair are described. In some embodiments, a transmitter may be configured to send a first plurality of transmit signals using multiple ports. The first plurality of transmit signals may be related to one another by a first set of complex weights. A receiver may be configured to receive channel-impaired versions of the first plurality of transmit signals using one or more ports, the channel-impaired versions of the first plurality of transmit signals propagating from the transmitter to the receiver via one or more propagation channels. The system may be configured to analyze the channel-impaired versions of the first plurality of transmit signals to estimate channel state information for the one or more propagation channels. The system may further be configured to use the channel state information to determine a second set of complex weights which will reduce the power received at one or more ports of the receiver when applied to a second plurality of transmit signals. The second set of complex weights may vary with frequency.

DETAILED DESCRIPTION

Systems and methods are described herein for improving isolation between a transmitter and a receiver in, for example, a cosite transmitter-receiver system. These techniques can improve the capability of a receiver to operate simultaneously with a cosite transmitter, for example allowing full duplex operation of the receiver in conjunction with the cosite transmitter.

Some techniques described herein relate to reduction or minimization of the amount of electromagnetic energy (e.g., in the radio frequency (RF) band) which is coupled into one or more antennas of a receiver from a cosite transmitter. According to these techniques, a plurality of complex weights can be used in the synthesis of a plurality of transmit signals which include scaled and/or phase shifted versions of a transmit waveform. The transmit waveform could be, for example, one or more digital communication symbols, intentional co-channel transmissions, one or more radar pulses, etc. The complex transmission weights may be different for different frequency sub-bands of the transmit waveform. The complex transmission weights can be determined, using feedback from the cosite receiver, to effect a reduced or minimum amount of coupling into one or more of the receive antennas. In some embodiments, the complex transmission weights may be selected to create at least a partial null of transmitted signal(s) at a particular receiver port, or at multiple receiver ports in alternating fashion, or to reduce energy coupling on a set of receive antennas. By suppressing the amount of energy coupled into receive antennas from a cosite transmitter, the receiver may be better positioned to receive desired signals from remote sources, which may typically be much weaker than coupled transmit signals from a cosite transmitter.

Suppression of the amount of energy coupled into one or more receive antennas from a cosite transmitter can be achieved by first sending the plurality of transmit signals using a plurality of transmit antenna ports. These signals can be received on the receive ports of the receiver. The relative amplitude(s) and/or phase(s) of the received versions of the transmit signals (which typically may be impacted by channel effects) may be analyzed in order to realize an appropriate combination of complex transmission weights that will result in a reduction or minimization of transmit energy that couples into one or more of the receive ports. This may be accomplished with feedback from the cosite receiver that helps the transmitter determine how to adjust the relative amplitude(s) and/or phase(s) of the transmit waveform amongst the plurality of transmit signals. The transmit antenna elements may have arbitrary spacings between one another, as well as arbitrary polarizations and/or arbitrary gain patterns. Some of the transmit antenna elements may be orthogonally-polarized, but this is not necessarily required. These techniques have proven capable of reducing signal power on at least one receive port, in some cases to levels near the noise floor of the cosite receiver.

Other techniques described herein use digital signal processing to suppress the transmit signal(s) at the cosite receiver. One approach employs a special transmit waveform involving the use of repetition codes, such as binary orthogonal repetition codes. Using this approach, the transmit waveform (which, again, may be one or more digital communication symbols, intentional co-channel transmissions, one or more radar waveforms, etc.) is repeated while applying a chip of the repetition code on each instance of the transmit waveform. For example, the transmit waveform may be a multicarrier symbol (e.g., an orthogonal frequency division multiplexing (OFDM) signal) that can be repeated twice, where the first symbol is multiplied by a +1 chip and the second symbol is multiplied by a −1 chip. Then, after synchronization, the receiver can sum the two symbols, thereby canceling the transmission from the cosite transmitter.

In some embodiments, various techniques described herein can be used in combination with one another. For example, RF suppression techniques can be used to limit RF coupling between the cosite transmitter-receiver pair, thereby allowing the receiver to make better use of its analog-to-digital-converter bits to enable detection of desired remote signals. The receiver can then exploit the digital signal processing techniques described herein to further suppress transmitted signal(s) at one or more receive ports.

Improved Cosite Isolation by Reducing Coupling of Electromagnetic Energy

Figure 1:
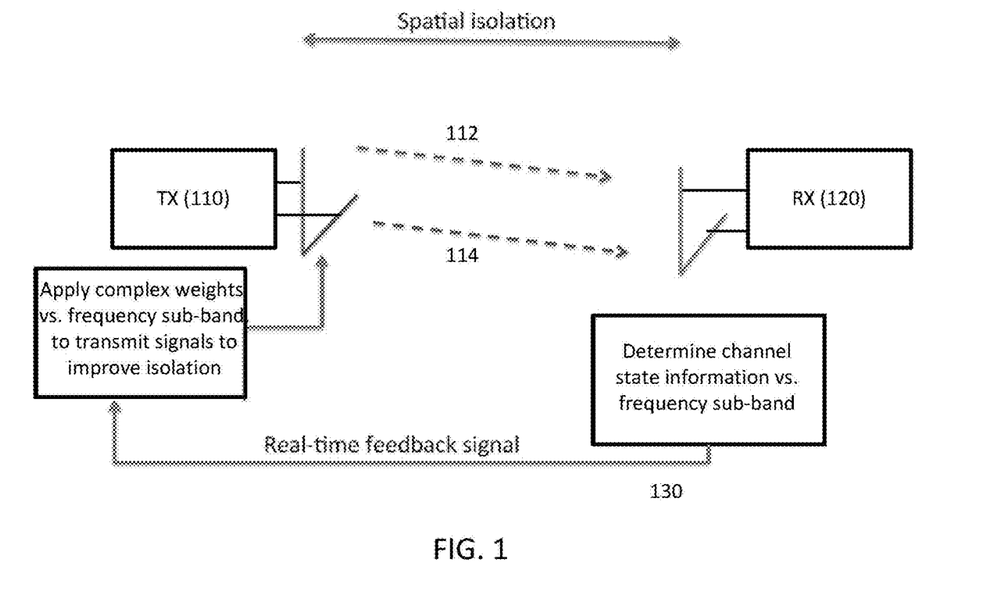
FIG. 1 illustrates an example transmitter-receiver system.

FIG. 1 illustrates an example transmitter-receiver system 100. The system 100 includes a transmitter 110 and a receiver 120. The transmitter 110 and the receiver 120 may be provided, for example, as part of a common platform or at a common location or facility so as to form a cosite transmitter-receiver system. The physical separation between the transmitter 110 and the receiver 120 may be sufficiently small such that transmissions from the transmitter at least partially degrade the performance of the receiver.

The transmitter 110 can have multiple transmit ports respectively connected to multiple antenna elements. The transmitter 110 can use these ports and antenna elements to transmit a plurality of transmit signals. In general, the transmitter 110 can have any number of transmit ports and any number of antenna elements. Some of the antenna elements may be spatially-separated. Some of the antenna elements may co-located and orthogonally-polarized.

According to some embodiments, the transmitter 110 can coherently synthesize the plurality of transmit signals. This may relate to the usage of a consistent phase reference and/or to the setting and preservation of a particular phase relationship among signals, and/or sub-bands of those signals. For example, the transmit signals emitted by the transmitter 110 can each be a complex weighted version of a common transmit waveform. The common transmit waveform may be, for example, one or more digital communication symbols, one or more radar pulses, etc. Each complex weight may be representative of an amplitude scaling value and/or a phase difference value. Thus, the transmit signals may be scaled and/or phase-shifted versions of one another. The transmit signals can have any relative amplitude and/or phase differences between them such that they are associated with any coherence state (e.g., a state defined by relative amplitude and/or phase differences between coherent transmit ports and/or beams). For example, some of the transmit signals may have an associated polarization state related to the relative phase difference between two transmit signals which are transmitted from orthogonally-polarized antenna elements. As another example, some of the transmit signals may have an associated beam state (e.g., beam shape and/or beam steering direction) related to the relative phase differences between multiple transmit signals which are transmitted from spatially-separated antenna elements. The complex weights can be used to control the coherence state of the transmit signals (e.g., a polarization state and/or a beam state). If signals are transmitted, for example, from different-polarized antenna elements that are spatially-separated, complex weights can still be used to control the output, but the result is not a polarization state or a beam state. The term coherence state is used to more generally characterize transmit states associated with any relative amplitude and/or phase differences between transmit signals.

In the particular example shown in FIG. 1, the transmitter 110 has two transmit ports which are respectively coupled to two orthogonally-polarized antenna elements. The transmitter 110 emits two transmit signals 112, 114 via the two transmit ports. The two transmit signals 112, 114 may be related to one another by a complex weight. Thus, one of the transmit signals 112 may be a scaled and/or phase shifted version of the other transmit signal 114. Since the transmit signals 112, 114 are transmitted via orthogonally-polarized antenna elements, the complex weight can be used to control the polarization state associated with the transmit signals. In other embodiments, two or more transmit signals (e.g., 112, 114) may be transmitted via spatially-separated antenna elements and the complex weight(s) can be used to control an associated beam state. In still other embodiments, multiple transmit antenna elements are used to send a plurality of transmit signals associated with any coherence state(s), where the transmit signals have any relative amplitude and/or phase differences and are emitted as any complex weighted combination from the transmitter ports.

In some embodiments, the transmit signals 112, 114 wirelessly propagate to the receiver 120 via one or more distinct propagation channels. The propagation channel(s) may have one or more impairments or other characteristics which cause the transmit signals 112, 114 to be modified as they propagate through the propagation channel(s). For example, the propagation channel(s) may be frequency dependent propagation channels, multipath propagation channels, etc. Thus, the versions of the transmit signals 112, 114 which arrive at the receiver 120 may be partially dependent upon the propagation channel(s). In some embodiments, the transmit signals (e.g., 112, 114) can be preamble or pilot signals which are known by the receiver 120. In such cases, the fact that the transmit signals are known by the receiver 120 helps the receiver to determine channel state information based on the received channel-impaired versions of the transmit signals.

In the case of polarized transmit signals, channel impairments can cause polarization mode dispersion (PMD) and/or polarization dependent loss (PDL). PMD is a spread, as a function of frequency, in the polarization state of the channel-impaired versions of the transmit signals as measured at the receiver. PMD can result from multipath and other frequency dependent propagation channels. In such propagation channels, the polarization state associated with the received channel-impaired versions of the transmit signals may vary with frequency in a correlated fashion. Propagation channels may also exhibit PDL. These losses may depend on the transmit polarization and may vary as a function of frequency sub-band. The magnitude of the PDL associated with each frequency sub-band may be dictated by channel state information (e.g., eigenvalues of the sub-band channel matrix) and the polarization state associated with one or more transmit signals signal relative to the associated polarization eigenmodes. For each frequency sub-band, there may exist one or more polarization states which result in heightened or maximum power transfer to the receiver 120 through a given propagation channel. Similarly, for each frequency sub-band, there may exist one or more polarization states which result in suppressed or minimum power transfer to the receiver 120 through a given propagation channel.

More generally speaking, channel impairments can cause coherence state dispersion and coherence state dependent loss in the channel-impaired versions of the transmit signals associated with any coherence state. In other words, channel impairments can cause a frequency-dependent spread in the relative amplitudes and/or phase differences between the channel-impaired versions of the transmit signals which are detected at the receiver 120. Similarly, channel impairments can result in losses which depend on the coherence state associated with the transmit signals and which vary with frequency. Thus, for each frequency sub-band there may exist one or more coherence states which result in heightened or maximum power transfer to the receiver 120 through a given propagation channel. Similarly, for each frequency sub-band, there may exist one or more coherence states which result in suppressed or minimum power transfer to the receiver 120 through a given propagation channel.

The cosite receiver 120 may be a single-port receiver or a multi-port receiver. In either case, each receiver port may detect multiple transmit signals. Thus, the received signal at any given receiver port may consist of the channel-impaired receiver responses to multiple transmit signals. Conventionally, the receiver may have no way of identifying the individual responses to the various transmit signals. But, according to the systems and methods described herein, the transmit signals can advantageously be synthesized in a manner such that they are mutually coherent and separable at the receiver 120. For example, the transmit signals may have one or more separability characteristics that allow the receiver 120 to identify, isolate, and/or distinguish the respective receiver responses to the transmit signals from one another. This can permit the receiver 120 to separate the received versions of the transmit signals. For example, the receiver 120 may include a signal processor that can be used to process the received signal(s) to identify, isolate, and/or distinguish the received versions of the separable transmit signals. This can be done by utilizing the separability characteristic of the transmit signals to separate the various received versions of the transmit signals from within those signals which are detected at one or more receiver ports.

In some embodiments, each transmit signal sent by the transmitter 110 corresponds to the output of one transmit port. Similarly, each receiver signal may correspond to the input at one receive port. However, instead of employing transmit/receive ports as the fundamental quantities, a transmit/receive signal can instead be associated with a beam derived from a complex weighted combination of ports or a directional antenna. In other words, it is not required that each transmit/receive signal correspond only to what is sent/received via a single antenna element. Instead, signals can be transmitted/received as different complex weighted combinations of the ports. For example, a transmit/receive signal may consist of scaled, phase-shifted outputs/inputs from multiple antenna elements. These complex weighted combinations can be frequency dependent (e.g., the weighted combination may be different for different frequency sub-bands). For spatially-separated antenna elements, frequency-dependent complex weights would generally correspond to different beam states (e.g., different beam shapes and/or beam steering directions) as a function of frequency. For a dual polarized antenna, frequency-dependent complex value weights would generally correspond to different polarization states as a function of frequency. For an antenna system with both spatially-separated and polarized antenna elements (i.e., a space-polarization architecture), a transmit signal may consist of a complex weighted combination involving other coherence states.

Although there is some degree of spatial isolation between the transmitter 110 and the receiver 120, they may be located in close enough physical proximity to one another such that signals transmitted from the transmitter 110 at least partially interfere with operation of the receiver 120 during the duration of the signals. This may prevent the receiver 120 from operating simultaneously with the transmitter 110. The techniques described herein may improve isolation between the transmitter 110 and the receiver 120. This can be accomplished by controlling the transmit signals on a frequency sub-band-by-sub-band basis using weighted coherent transmissions from, for example, orthogonally-polarized and/or spatially-separated antenna elements. Feedback from the receiver 120 can be used to set the complex transmission weights (e.g., on a frequency sub-band-by-sub-band basis) in order to reduce or minimize the power received at one or more ports of the receiver 120. This can result in significant improvement in the isolation between the cosite transmitter 110 and the receiver 120. As this technology can use measured relative signal properties that are fed back to the transmitter 110 from the receiver 120, it applies to near-field and far-field regions.

In some embodiments, to facilitate determination of a set of complex weights which reduce or minimize power transfer of the transmit signals to the receiver 120, the transmitter 110 may emit low-power preamble or pilot signals which are known by the receiver 120. The receiver 120 may measure one or more properties of the channel-impaired versions of the transmit signals which it detects in order to determine channel state information. The receiver 120 can then feed channel state information back to the transmitter 110. This enables the transmitter 110 to adjust the complex transmission weights, independently for each frequency sub-band, to reduce or minimize the received power across one or more sub-bands at a desired receive antenna port. The techniques described herein can advantageously be achieved via digital baseband processing and circuits, which may be easier to implement than radio frequency (RF) circuitry.

The techniques described herein have potential application to, for example, the following fields:
Communications
  Improving Tx/Rx RF isolation in a communications system (e.g., to support full duplex operation);
  Aiding interoperability of communications systems operating in frequency bands that are close so that neither receiver is blinded by the other system's transmission.
Jamming and Communications Systems Interoperability
  Supporting interoperability among jammers and communication systems to enable the transmission of jamming signals without blinding the receiver.
Radar
  Enhancing RF isolation in monostatic and pseudo-monostatic radar architectures as well as radars that implement multiple simultaneously transmitted waveforms.
  Detecting ground penetrating radar (GPR) targets (e.g., to detect a buried person in a disaster situation). In the case of the GPR system, the features of adaptive transmission along with power control and target sensing provides a way to detect such difficult targets.

Many other applications of the technology described herein are also possible.

System Overview

Figure 2:
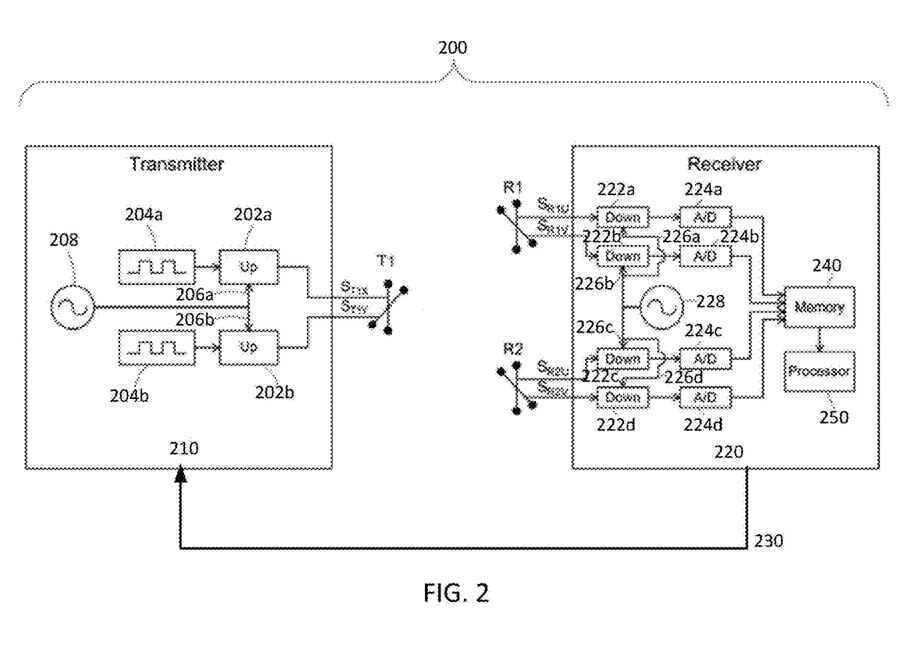
FIG. 2 illustrates a more detailed block diagram of an example transmitter-receiver system.

FIG. 2 illustrates a more detailed block diagram of an example transmitter-receiver system 200 according to FIG. 1. The system 200 includes a transmitter 210 and a receiver 220. In this example, the transmitter 210 has a transmitting antenna T1 with orthogonally-polarized antenna elements. (Although the system 200 is illustrated with co-located orthogonally-polarized transmitting antenna elements, multiple spatially-separated transmitting antenna elements, or a combination thereof could also be used.) The dual polarized transmitting antenna T1 is x-polarized and y-polarized, where x and y represent any pair of orthogonal polarizations, including vertical and horizontal, right and left-hand circular, slant +45° and slant −45°, etc.

Further, in the example of the FIG. 1 system 100 which is shown in FIG. 2, the receiver 220 is connected to two spatially-separated receiving antennas R1, R2, each having two orthogonally-polarized antenna elements. In some embodiments, the receiving antennas R1, R2 are typically separated by at least one half wavelength of the RF carrier frequency used by the transmitter 210. The first dual polarized receiving antenna R1 is u-polarized and v-polarized, where u and v represent any pair of orthogonal polarizations, including vertical and horizontal, right and left-hand circular, slant +45° and slant −45°, etc. In some embodiments, either the u- or v-polarization is co-polarized with the x- or y-polarization of the transmitting antenna T1, but this is not required. In some embodiments, the second dual polarized receiving antenna R2 is also u-polarized and v-polarized. However, in other embodiments, the orthogonal polarizations of the second receiving antenna R2 can be different than those of the first receiving antenna R1.

The transmitter 210 includes waveform generators 204a, 204b that can respectively provide baseband waveforms $S_{T1x}$ and $S_{T1y}$ that are coherently synthesized with a desired phase relationship (e.g., a phase difference designed to achieve a particular coherence state, such as a polarization state). This may relate to the usage of a consistent phase reference and/or the setting and preservation of a particular phase relationship among signals, and/or sub-bands of those signals. In some embodiments, the shapes of the waveforms for the transmit signals are substantially similar or identical, but the signals are scaled with relative amplitude and/or relative phase with respect to one another. Also, the transmit signals may be transmitted via different antenna elements, via different transmission beams, with different time delays, or with different frequency offsets. Although only two waveform generators are illustrated, any number of waveform generators could be included depending upon, for example, the number of transmit ports. In addition, for transmitters which are coupled to spatially-separated antenna elements, the waveform generators may coherently synthesize transmit signals with desired phase relationships to achieve a particular beam state.

The waveform generators 204a, 204b can provide any of the following waveforms: single tone continuous wave, wideband noise, band-limited noise, chirp, stepped frequency, multi-tone, pulses, pulsed chirps, orthogonal frequency division multiplexing (OFDM), binary phase shift keying (BPSK), linear FM on pulse (LFMOP), etc. It should be understood, however, that these are just example waveforms and that a wide variety of other waveforms can also be used, including any desired arbitrary waveform that may be suited to a given application. Each of the waveform generators 204a, 204b can operate independently and can provide different waveforms at any given time. In some embodiments, the transmit signals can be scaled and/or phase-shifted versions of one another. For example, when using a dual-polarized transmit antenna, controlling the relative phase and amplitude between the orthogonally-polarized antenna elements leads to control over the transmitted polarization state. Similarly, when using spatially-separated transmit antenna elements, controlling the relative phase and amplitude between antenna elements leads to control over the transmitted beam state.

The baseband waveforms produced by the waveform generators 204a, 204b can be provided to up-converters 202a, 202b to be shifted to an RF carrier frequency $f_0$. The RF carrier frequency is provided by the local oscillator 208. One way to help achieve coherency between the transmit signals is to share a common local oscillator 208 used in the up-conversion processing. A common local oscillator can be advantageous in a multichannel transmitter because any impairments in the local oscillator 208 may affect all channels relatively equally, thus not substantially affecting relative channel-to-channel comparisons. In some instances, control over the local oscillator phase may be advantageous, for example to assure that the starting phase reference for each transmit signal is substantially identical (or if not identical then known so that the phase difference between transmit signals can be compensated). The carrier frequency is fed from the local oscillator 208 to the up-converters 202a, 202b via signal lines 206a, 206b. In some embodiments, the signal lines 206a, 206b are matched signal lines so as to maintain the phase coherency of the carrier frequency at the up-converters 202a, 202b. As shown in FIG. 2, a single local oscillator 208 can feed both up-converters 202a, 202b. Alternatively, different local oscillators can respectively feed the up-converters 202a, 202b. But, if different local oscillators are used, they are preferably synchronized in phase and frequency.

FIG. 2 illustrates one system for synthesizing transmit signals, but others can also be used. For example, the transmitter 210 can transmit a signal consisting of two or more coherent continuous-wave or pulsed (or otherwise modulated) RF tones. Or two or more coherent signals can be directly generated using digital signal processing followed by digital-to-analog conversion. Other methods of coherent signal generation are also possible.

In some embodiments, each signal channel in the transmitter 210 can be substantially phase and gain matched with the others. In order to achieve this matching, compensation circuits can be included. For example, if the transmitter 210 includes different amplifier circuits in each channel, then depending upon the transmit signal and the non-linear behavior of the amplifier in each channel, it may be possible for asymmetrical signal distortion to occur (e.g., the effects on one channel are not identical to the other channels). Such behavior could be detrimental to a coherent, matched system, and so compensation circuits can be used to reduce or minimize undesired phase and gain mismatches in the signal channels.

As just discussed, in some embodiments the transmitter 210 is designed such that desired phase relationships can be set and preserved between the various transmit signals. In some embodiments, the transmitter 210 can advantageously achieve precise control of the phase, amplitude, sampling, and frequency among the various generated signals used at the transmitter. Further, in some embodiments, the phase noise of the local oscillator 208 is negligible such that energy of a desired signal in one sub-band coupling to an adjacent sub-band is significantly less (e.g., two or more orders of magnitude less) than the signal being detected in that adjacent band.

In addition, the transmit signals $S_{T1x}$ and $S_{T1y}$ may advantageously be separable. This means that the transmit signals $S_{T1x}$ and $S_{T1y}$ have a separability characteristic that can be used by the receiver 220 to distinguish one transmit signal from another. (If additional transmit signals are used, they, too, may be separable.) The different signals generated at the transmitter 210 may be approximately orthogonal in some sense so that the signals can be separated at the receiver 220 with little crosstalk among the signals. The separability property of the transmit signals can be achieved in several different ways, including, for example, through the use of time division multiplexing, frequency division multiplexing, code division multiplexing, and/or beam multiplexing. Methods based on eigendecomposition or singular value decomposition can also be used. Other methods may also be possible.

Figure 3:
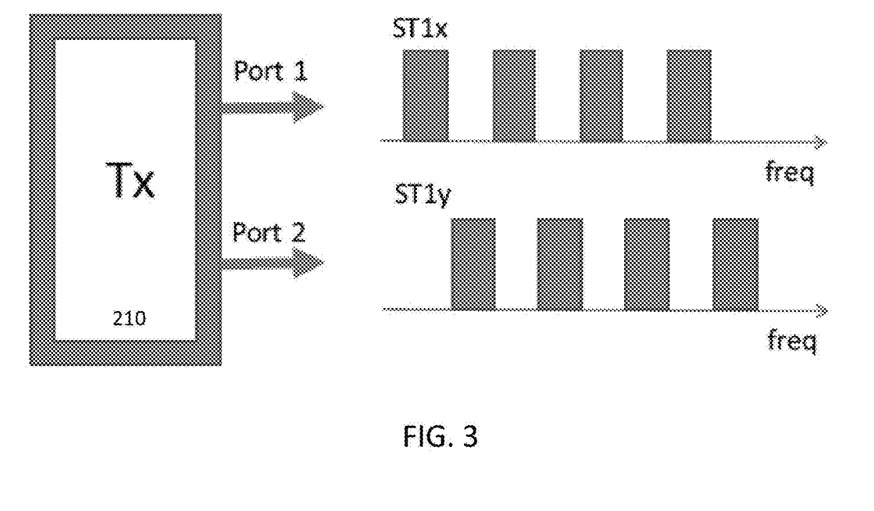
FIG. 3 illustrates two separable transmit signals which can be used in the system shown in FIG. 2.

In the case of time division multiplexing, the signals $S_{T1x}$ and $S_{T1y}$ can be transmitted during different time slots such that the receiver 220 can distinguish the response of each of the receiving antennas to each of the transmit signals. However, in some cases it may be advantageous for the signals to partially or fully overlap in time. In cases where it is desirable that the signals $S_{T1x}$ and $S_{T1y}$ be transmitted at the same time (or at time periods which at least partially overlap), then frequency division multiplexing, code division multiplexing, beam multiplexing, eigendecomposition, singular value decomposition, and/or other methods can be used. Frequency multiplexing involves the use of different frequency sub-bands to achieve separability, as shown in FIG. 3. Beam multiplexing involves the use of different beam steering directions to achieve separability. Code multiplexing involves the use of codes, such as orthogonal codes to achieve separability.

FIG. 3 illustrates two separable transmit signals $S_{T1x}$, $S_{T1y}$ which can be used in the system 200 shown in FIG. 2. In the illustrated example, the two transmit signals are separable based on frequency division multiplexing. FIG. 3 shows an abstract representation of the transmitted signals $S_{T1x}$ and $S_{T1y}$ in the frequency domain. The bandwidth (BW) of the signals $S_{T1x}$ and $S_{T1y}$ is shown as being separated into 8 segments. The shaded regions indicate the frequency bands utilized by each signal. As illustrated, in this case $S_{T1x}$ utilizes the odd frequency sub-bands (i.e., frequency sub-bands 1, 3, 5, and 7). Meanwhile, $S_{T1y}$ utilizes the even frequency sub-bands (i.e., frequency sub-bands 2, 4, 6, and 8). Because the signals $S_{T1x}$ and $S_{T1y}$ do not overlap in frequency, the responses to these transmitted signals at the receiving antennas can be separately determined despite the fact that the signals may be transmitted at the same time. In embodiments with a greater number of transmit signals, a similar frequency-interleaved approach can be used where each transmit signal uses every Nth sub-band, where N is the number of transmit signals.

After separating the transmit signals based on frequency sub-bands, it may be desirable to interpolate the results for any missing sub-bands of interest. For example, interpolation can be used to fill in the even sub-bands for $S_{T1x}$ and the odd sub-bands for $S_{T1y}$. The sub-band spacing may be designed so that the propagation channel transfer function does not change appreciably between sub-bands. Linear interpolation, spline smoothing, or other appropriate methods may be employed to compute any missing sub-band values.

It should be understood that FIG. 3 illustrates just one idealized example of a frequency division multiplexing scheme. Many others can be used. Further, although code division multiplexing is not illustrated, it too can be used to transmit separable signals at the same or overlapping times.

The transmitter 210 transmits the separable baseband signals $S_{T1x}$ and $S_{T1y}$, up-converted to the RF carrier frequency, via the antenna T1. The $S_{T1x}$ signal is transmitted via the x-polarized element of the transmitting antenna T1, while the $S_{T1y}$ signal is transmitted via the y-polarized element of the transmitting antenna.

The receiver 220 can down-convert the received signals and perform analog-to-digital conversion. This is done using the down-converters 222a-d and the analog-to-digital converters 224a-d. Each of these components can be connected to, and controlled by, a common local oscillator 228 and/or clock signal (as applicable depending upon the circuitry) in order to maintain consistent phase and/or timing references. For example, the received signals can be down-converted using a consistent phase reference and the analog-to-digital converters can take synchronous samples. This helps to ensure that relative phase information between the received signals is preserved in the digitized signals. In addition, the signal lines 226a-d from the local oscillator 528 to the various components can be matched so as to further help maintain phase coherency in the receiver. Although FIG. 2 illustrates a single local oscillator 228, multiple oscillators can be used if they are synchronized. The digital signals that are output from the analog-to-digital converters 224a-d can be saved in a memory 240 and sent to a signal processor 250 for analysis. Though not illustrated, the receiver 220 can also include signal conditioning circuitry, such as amplifiers, filters, etc. In addition, the receiver 220 could include an intermediate frequency (IF) processing stage.

Part of the processing that can be performed by the receiver 220 is separating the signal responses at each of the four receiver antenna inputs which are attributable to each of the transmit signals $S_{T1x}$ and $S_{T1y}$. For example, the response at the u-polarization component of the first receiver antenna R1 will, in general, consist of a superposition of channel-modified versions of the transmit signals $S_{T1x}$ and $S_{T1y}$ transmitted at both the x- and y-polarizations, respectively. The same will generally be true of the response at the v-polarization component of the first receiving antenna R1 and of the u- and v-polarization components of the second receiving antenna R2. The receiver 220 can perform signal separation operations to isolate the response at each receiver input that is attributable to each of the transmit signals.

In the case where the transmit signals $S_{T1x}$ and $S_{T1y}$ are made separable using frequency division multiplexing (as shown in FIG. 3), the respective signals $S_{T1x}$ and $S_{T1y}$ which are received at the u-polarization component of the first receiving antenna R1 can be obtained by isolating the frequency components respectively used by each of the transmit signals. The same can be done for the signals received at the other three receiver inputs. Of course, the particular signal separation operations that are performed will be dependent upon the technique (e.g., time division multiplexing, frequency division multiplexing, and/or code division multiplexing) used at the transmitter 210 to make the transmit signals separable. Techniques are known in the art for separating signals which have been combined using these multiplexing techniques, as well as other techniques such as eigendecomposition or singular value decomposition techniques. Any such separation techniques can be employed by the receiver 220.

In some embodiments, the received signals are coherently received and analyzed. Phase information can be preserved between the various received signals. For example, the received signals can share a common local oscillator 228 used in the down-conversion processing and the signals can be synchronously sampled during digital conversion. Coherence at the receiver may entail synchronization of the signal channels in various forms, which can include: phase synchronization; frequency synchronization, sampling synchronization; and local oscillator synchronization in frequency, time, and/or phase. Additionally, it may be desirable that the receiver signal channels are gain and phase matched (from the antennas to the analog-to-digital converters) across all frequency components of interest and that the local oscillator signal gains to each channel are substantially matched. In some embodiments, the receiver 220 can advantageously achieve precise control of the phase, amplitude, sampling, and frequency among the various receiver channels.

In some embodiments, the receiver 220 can also be coherent with the transmitter 210. For example, the transmitter 210 and the receiver 220 could share a common phase reference such as a local oscillator (e.g., as in a monostatic embodiment where the transmitter and receiver are co-located).

As already mentioned, the signal channels of the receiver 220 can be phase and/or gain matched. In some cases, the phase and/or gain matching can be dynamically adjusted. This can be accomplished using phase shifting elements and/or amplifiers in each receiver channel. In some embodiments, these phase shifting elements and/or amplifiers can be adjustable based on, for example, a calibration control input. The calibration control input can be obtained by passing a calibration signal through the various receiver processing channels. The effect of each processing channel on the calibration signal can then be determined. A calibration control input can be generated in order to reduce or eliminate differences between the effects that each processing channel has on the calibration signal. For example, a calibration control input can be generated in order to reduce or eliminate differences between the respective gains of the receiver channels and/or to reduce or eliminate phase differences between the channels. In addition, the phase and/or gain matching can be temperature compensated to help reduce phase and/or gain mismatches which may be induced at different operating temperatures. Digital compensation of the digitized signals can also be employed to achieve phase and/or gain matching.

The system 200 may also include a feedback communication channel 230 between the receiver 220 and the transmitter 210. The feedback communication channel 230 may be, for example, a wired communication connection in the case of a cosite transmitter-receiver system. The feedback communication channel 230 may be used by the receiver 220 to send channel state information to the transmitter 210, as discussed herein.

Theory and Methods of Operation

In some embodiments, the cosite transmitter-receiver systems (e.g., 100, 200) incorporate at least two physically displaced, dual polarized antenna systems: one for transmission and the other for receive. RF isolation between the transmitter 110, 210 and a selected receiver port can be accomplished for each frequency sub-band via baseband control of the transmit signal polarization (or other coherence state) based on feedback from the cosite receiver 120, 220. For each frequency sub-band of interest, the signal on any remaining port of the receiver may be used for digital suppression of the transmit signal residue in the first port.

Using feedback from the receiver 120, 220, baseband signal control may be applied at the transmitter 110, 210 to adapt the polarization (or other coherence state) of its transmission on a frequency sub-band-by-sub-band basis to achieve a sustained wideband null on the receive antenna. This approach can yield frequency-dependent polarization nulling (or more generally speaking, frequency-dependent coherence state nulling) to compensate for the polarization dispersion (or coherence state dispersion) versus frequency that may occur between the transmit and receive antennas due to propagation channel impairments, such as local multipath. One beneficial feature of this approach is that the polarization control (or more generally speaking, coherence state control) may be accomplished at baseband in signal processing. The fact that the signals may not be in the far-field, but rather may be in the near field is inconsequential; a feedback loop can still operate to indicate the relative transmit weightings needed to achieve a null at a selected receiver port.

The transmit signals may be pilot signals which are periodically transmitted to enable measurement of channel state information, such as the channel transfer function. These pilot signals may be known by the receiver 120, 220. The receiver 120, 220 can make the channel state measurements and then feed associated information back to the transmitter 110, 210 in real time via the feedback communication channel 230. The transmitter 110, 210 may use the feedback to adapt the complex transmission weights of the transmit signals, as a function of the frequency sub-band, to achieve at least a partial null over at least a portion of the band at a selected receive antenna. The process can be repeated at a selected rate to maintain the null.

Let $u(t)=u_{bb}(t)e^{j\omega t}$ represent a transmit preamble signal waveform (known by the receiver 120, 220), where $u_{bb}(t)$ is a complex baseband signal. Further, let the unit-norm complex vector $\underline{\rho}=[\rho_x\ \rho_y]^T$ designate the matched polarization state of transmit signals sent via orthogonally-polarized antenna elements, where x and y designate orthogonally-polarized signal basis components. The transmit signals are therefore given by $$u(t)\underline{\rho}=u_{bb}(t)e^{j\omega t}[\rho_x \rho_y]^T \quad (1.1)$$

The propagation channel between the transmitter 110, 210 and the receiver 120, 220 can be modeled as a frequency-selective, L-tap multipath fading channel with contiguous sub-channels in frequency that are time-invariant over the coherence time interval. The multiple-input multiple-output (MIMO) channel impulse response may be represented by the channel matrix $$h(t) = \begin{bmatrix} \sum_{n=1}^{N} h^{xv}(\tau_n)\delta(t-\tau_n) & \sum_{n=1}^{N} h^{yv}(\tau_n)\delta(t-\tau_n) \\ \sum_{n=1}^{N} h^{xw}(\tau_n)\delta(t-\tau_n) & \sum_{n=1}^{N} h^{yw}(\tau_n)\delta(t-\tau_n) \end{bmatrix}, \quad (1.2)$$

where N is the number of multipaths associated with the propagation channel from the transmitter to the receiver, $\tau_r^p < T_s L$ is the propagation delay associated with the $r^{th}$ propagation path, $T_s$ is the tap delay, and $h_r^{ij}$ is a complex channel gain between the input signal vector component i and the output signal vector component j for the $r^{th}$ propagation path.

The received signal vector, $\underline{\upsilon}=[\upsilon_u\ \upsilon_w]^T$ (in the case of a dual polarized receive antenna), is equal to the convolution of the transmit signals with the MIMO channel impulse response, and is given by $$\begin{bmatrix} v^v(t,\theta) \\ v^w(t,\theta) \end{bmatrix} = \int_{-\infty}^{\infty} h(\tau)\underline{\rho}(\theta)u(t-\tau)d\tau \quad (1.3)$$

$$= \begin{bmatrix} \sum_{n=1}^{N} h^{xv}(\tau_n)\rho^x(\theta)u(t-\tau_n^x) + \sum_{m=1}^{M} h^{yv}(\tau_m)\rho^y(\theta)u(t-\tau_m^y) \\ \sum_{n=1}^{N} h^{xw}(\tau_n)\rho^x(\theta)u(t-\tau_n^x) + \sum_{m=1}^{M} h^{yw}(\tau_m)\rho^y(\theta)u(t-\tau_m^y) \end{bmatrix} \quad (1.4)$$

The channel transfer function may be represented by the channel matrix $H_k$, where $$H_k = \mathcal{F}(h(t))|_k = \begin{bmatrix} H_k^{xv} & H_k^{yv} \\ H_k^{xw} & H_k^{yw} \end{bmatrix}, k=0,1,\ldots,K \quad (1.5)$$

and where $\mathcal{F}(h)|_k$ indicates the $k^{th}$ sub-band of the K-point FFT of each element of h. The superscript pairs in the matrix entries correspond to the transmit (x and y) and receive (v and w) polarization basis components, respectively. The number of sub-bands K can be selected to be sufficiently large, with sufficiently narrow sub-bands, so that the propagation channel exhibits flat fading in each sub-band. Using a frequency-domain representation, the kth sub-band of the received signal is $$\underline{V}_k=[V_k^v V_k^w]^T=H_k\underline{\rho}(\theta)U_k+\underline{a}_k \quad (1.6)$$

where $\underline{U}_k=\mathcal{F}(u(t))|_k$ and where the elements of $\underline{a}_k$ are the receiver noise components To facilitate channel estimation at the receiver, the transmit signals may be separable (e.g., separable in time or sub-band frequency). If the transmit signals are transmitted at separate times, then when the first antenna element is employed, the transmit polarization vector is $$\underline{\rho}_x(k)=[1\ 0]^T \forall k \in \{1,2,\ldots N\} \quad (1.7)$$

And when the second antenna element is employed, the transmit polarization vector is $$\underline{\rho}_y(k)=[0\ 1]^T \forall k \in \{1,2,\ldots,N\} \quad (1.8)$$

The corresponding frequency-domain received signals are $$\underline{V}_v=H_k\underline{\rho}_x(k)U_k=[H_k^{xv}H_k^{xw}]^T U_k \quad (1.9)$$

And $$\underline{V}_w=H_k\underline{\rho}_y(k)U_k=[H_k^{yv}H_k^{yw}]^T U_k \quad (1.10)$$

The channel gains can be derived directly from these received signals if the transmit signal waveform $U_k$ is known.

With knowledge of the channel gains, it follows that for any sub-band, a null can be achieved on either of the receive ports by setting $\underline{\rho}$ at the transmitter to $$\underline{\rho}_v(k)=[H_k^{yv}-H_k^{xv}]^T \quad (1.11)$$

for a null on the v port, and $$\underline{\rho}_w(k)=[H_k^{yw}-H_k^{xw}]^T \quad (1.12)$$

to achieve a null on the w port.

Figure 4:
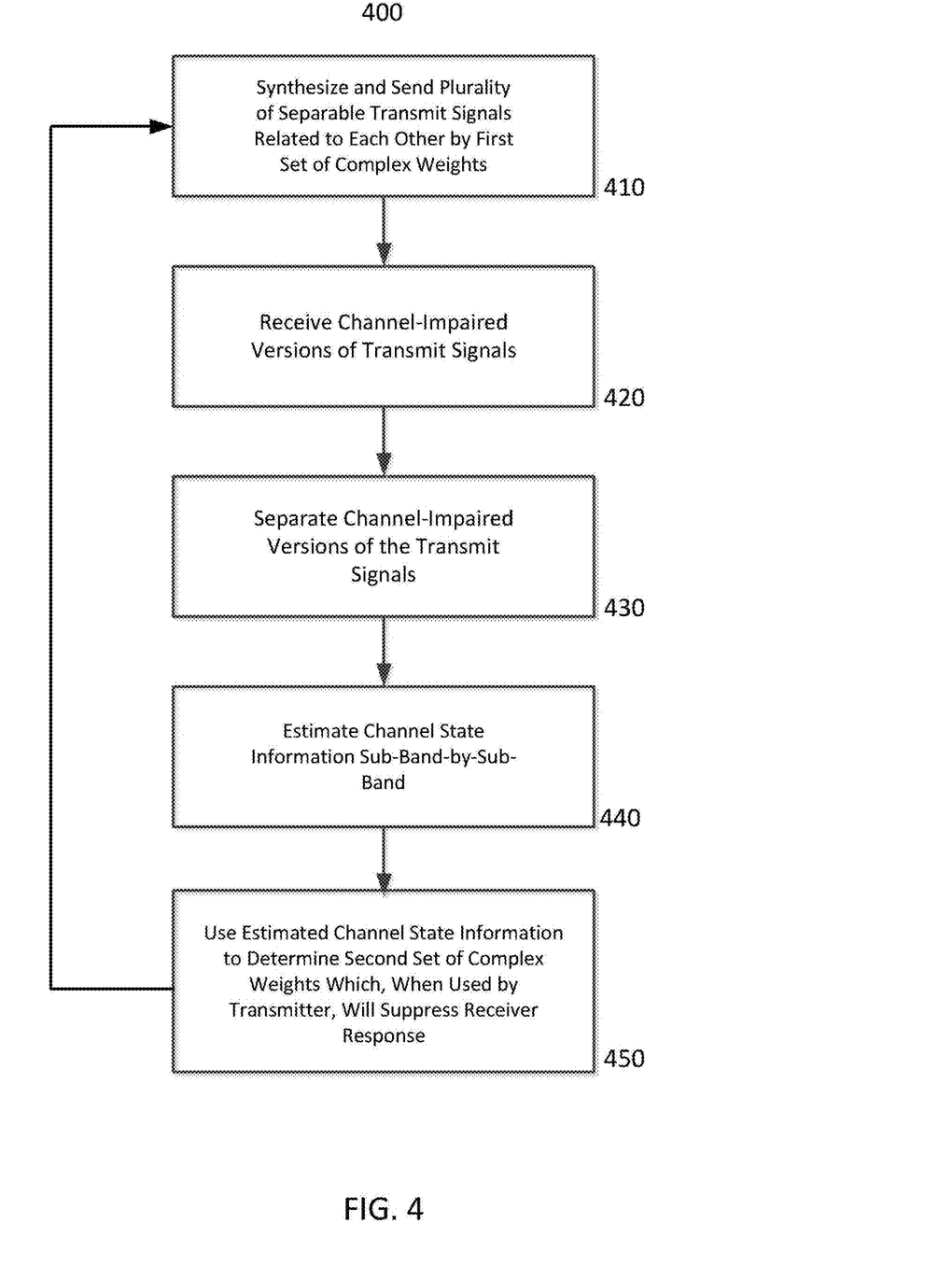
FIG. 4 illustrates an example method for improving isolation between a cosite transmitter-receiver pair.

FIG. 4 illustrates an example method 400 for improving isolation between a cosite transmitter-receiver pair. The method begins at block 410 where the transmitter 110, 210 synthesizes a plurality of transmit signals (e.g., $T_1$, $T_2, \ldots, T_N$). In some embodiments, the transmit signals, $T_1$, $T_2, \ldots, T_N$, are complex-weighted versions of a common transmit waveform, $u_{bb}(t)$. The complex weights, $a_1$, $a_2, \ldots, a_n$, can introduce differences in relative amplitude and/or relative phase amongst the transmit signals. The weighted transmit signals can be written as, for example, $T_1=a_1*u_{bb}(t)$, $T_2=a_2*u_{bb}(t), \ldots, T_N=a_n*u_{bb}(t)$. The transmit signals may have multiple frequency sub-bands and the complex weights which relate the transmit signals may be different for each sub-band. Thus, the coherence state (e.g., polarization state and/or beam state) associated with the transmit signals can be different for each frequency sub-band. In addition, the transmit signals can include a separability characteristic (e.g., signal orthogonality, as in time multiplexing, frequency multiplexing, code multiplexing, etc.) which makes them separable at the receiver 120, 220. The transmitter 110, 210 then sends the transmit signals using, for example, a plurality of transmit ports connected to antenna elements (e.g., spatially-separated and/or polarized antenna elements).

At block 420, the transmit signals arrive at the receiver 120, 220 via one or more wireless propagation channels and the receiver 120, 220 detects the channel-impaired versions of the transmit signals. At block 430, the receiver 120, 220 may separate, identify, isolate, and/or distinguish the channel-impaired versions of the transmit signals using the separability characteristic.

At block 440, the system 100, 200 can use the signals received at the receiver 120, 220 to estimate channel state information for the propagation channel(s) between the transmitter 110, 210 and the receiver. Channel state information can be derived in a number of ways, including, for example, using least squares estimates or minimum mean square error estimation. Other techniques may also be used. In the case where the transmit signals, such as pilots or preambles, are known in advance by the receiver 120, 220 channel state information can be estimated accurately. If the transmit signals are unknown to the receiver, channel state information can be estimated blindly and/or relative channel state information may be estimated, as discussed in "Polarization-Based Zero Forcing with Channel Estimation," by Pratt et al., published in Military Communications Conference, 2011—MILCOM 2011, the entirety of which is hereby incorporated by reference herein. This processing may be done by, for example, a local signal processor 250 at the receiver 120, 220, or a remote processor, or a distributed system of multiple processors. In some embodiments, channel state information is provided to the transmitter 110, 210 via the feedback communication channel, which may be, for example, any type of conventional wired communication interface.

At block 450, the system 100, 200 can use the channel state information to determine a new set of complex weights, $b_1, b_2, \ldots, b_n$, which will reduce the amount of signal power received at one or more selected ports of the receiver 120, 220. These complex weights can be different for each frequency sub-band. Different complex transmission weights for different frequency sub-bands are advantageous because the propagation channel between the transmitter 110, 210 and receiver 120, 220 is likely to include multipath. As a result, the self-interference signal at the receiver is likely to exhibit coherence state dispersion, especially for wider-band signals. Hence a single transmit coherence state may be incapable of achieving a wideband null. However, by controlling the coherence state as a function of the frequency sub-band, an improved wideband null becomes possible. This processing to determine the new set of complex transmission weights may be done by, for example, a local signal processor at the transmitter 110, 210, a remote processor, the local processor 250 at the receiver, or a distributed system of multiple processors. The signal power at a selected port of the receiver can be reduced by taking advantage of channel losses which are at least partially dependent upon the coherence state (e.g., the relative amplitudes and/or phase differences) associated with the transmit signals.

As illustrated in FIG. 4, the method 400 can be repeated. This is because the properties of the channel(s) between the transmitter 110, 210 and the receiver 120, 220 can vary over time, as can the transmitting and/or receiving properties of the transmitter-receiver system itself (e.g., transmission power, boresight direction, etc.). Thus, in order to maintain a desired amount of signal suppression at the receiver 120, 220, the complex weights which are applied to the transmit signals may also need to vary in time. In some embodiments, the transmitter-receiver system 100, 200 includes fast processing devices (e.g., application-specific integrated circuits (ASICs), etc.) which may permit the complex transmission weights to be updated in real-time.

Figure 5:
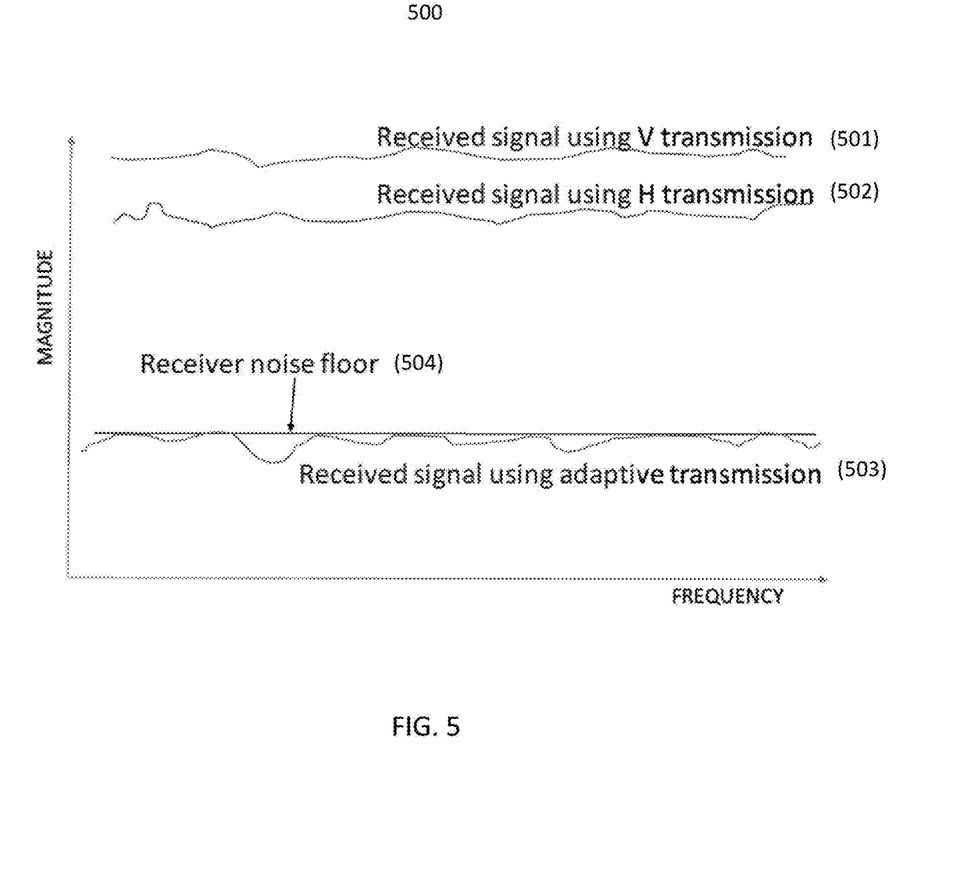
FIG. 5 is a graph which illustrates an example of improved cosite receiver isolation using the method of FIG. 4.

FIG. 5 is a graph 500 which illustrates an example of improved cosite receiver 120, 220 isolation using the techniques described herein. The graph 500 shows the magnitude of a vertically-polarized signal 501 received by the receiver 120, 220 for the case where the corresponding transmit signals were sent using complex transmission weights associated with a vertical polarization state. The graph 500 also shows the magnitude of a horizontally-polarized signal 502 received by the receiver 120, 220 for the case where the corresponding transmit signals were sent using complex transmission weights associated with a horizontal polarization state. The graph 500 also shows the noise floor 504 of the receiver 120, 220. As shown in the FIG. 5, the vertically-polarized and horizontally-polarized receive signals were both well above the noise floor 504. But FIG. 5 also shows a received signal 503 which was sent using modified complex transmission weights, which vary by frequency sub-band. The modified complex transmission weights for each frequency sub-band were determined adaptively according to the techniques described herein. As seen in the graph 500, this transmission with complex weights which vary by frequency resulted in a signal at the receiver 120, 220 with reduced signal power at or near the noise floor 504.

Improved Cosite Isolation by Digital Signal Processing at the Receiver

Figure 6:
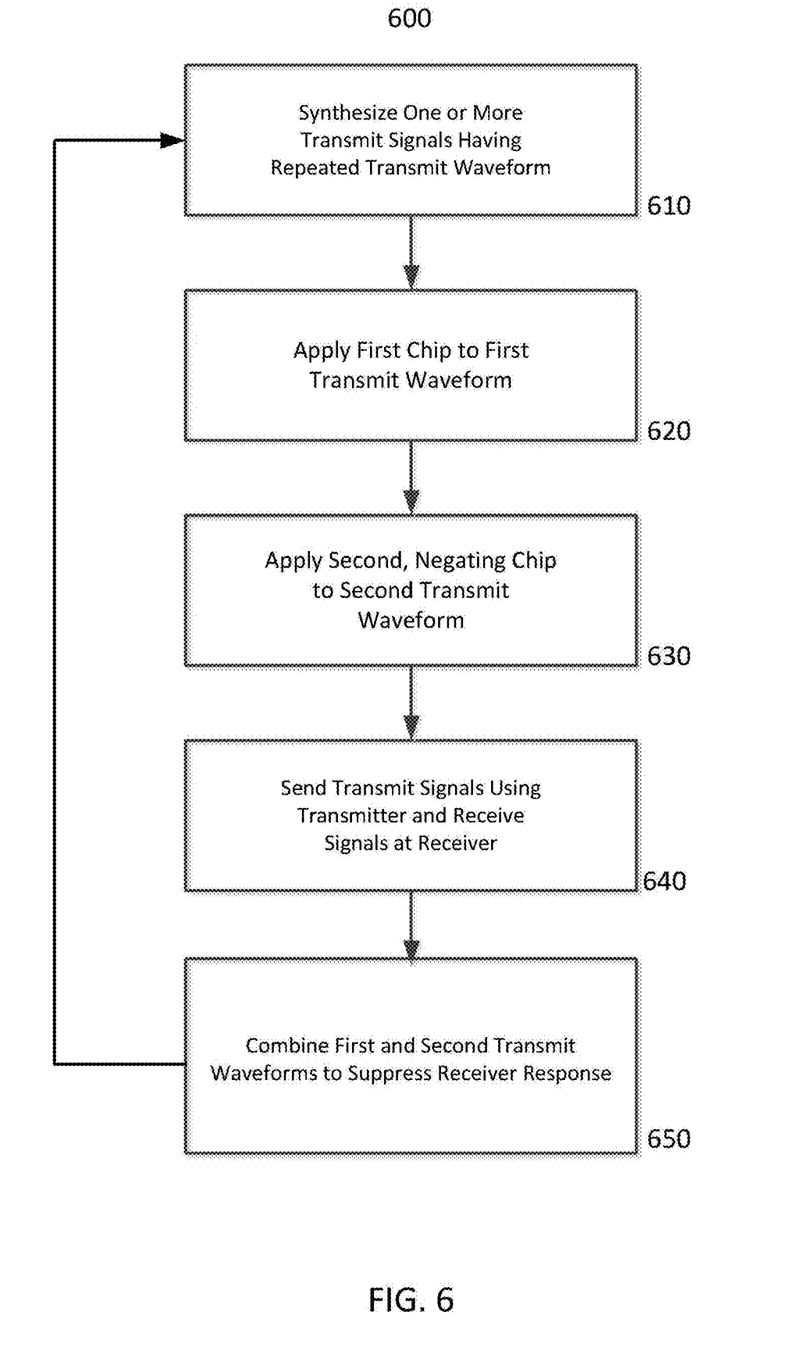
FIG. 6 illustrates an example digital signal processing method for suppressing one or more transmit signals at a cosite receiver.

Other techniques described herein use digital signal processing to suppress the responses to the transmit signal(s) at the cosite receiver. FIG. 6 illustrates an example digital signal processing method 600 for suppressing one or more transmit signals at a cosite receiver. The method begins at block 610 where the transmitter 110, 210 synthesizes one or more transmit signals which include a repeated transmit waveform. In some embodiments, the repeated transmit waveform is a digital communications symbol, although it does not have to be. The symbol may be a multicarrier symbol with frequency content in multiple sub-bands, such as an orthogonal frequency division multiplexing (OFDM) symbol. In some embodiments, each symbol is provided two times in succession.

At blocks 620 and 630, chip signals are applied to the repeated symbol. The chip signals may be, for example, orthogonal binary chip signals. And the second chip signal may be a negating chip signal which can be used to have a canceling effect with regard to the first chip signal. As an example, assume that the first chip signal is a +1 and the second chip signal is a −1, though many other pairs of chip signals can also be used. The transmitter 110, 210 may apply the first chip signal to the first of the repeated pair of digital communications symbols. In this example, this may be accomplished by multiplying the +1 chip signal times the first symbol to be transmitted. The transmitter 110, 210 may then apply the second chip signal to the second of the repeated pair of symbols. This may be accomplished by multiplying the −1 chip signal times the second symbol in the repeated pair of symbols.

At block 640, the transmitter 110, 210 sends the repeated symbols via one or more transmit antennas. These symbols may be detected by a cosite receiver 120, 220. If the symbols are sent successively over a relatively short period of time, then there will likely be negligible variation in the propagation channel over the period of time the repeated symbols are sent.

At block 650, the cosite receiver 120, 220 can suppress the received signal(s) by combining the first and second symbols. Since one of the chip signals negates the other, the combining of the received symbols results in total or partial cancellation of the received signal(s). For example, in this case, the receiver can combine the repeated symbols by adding the first symbol (to which the first chip signal was applied) to the second symbol (to which the negating second chip signal was applied). Due to the negating action of the second chip signal, the receiver response to the transmitted symbols can be substantially suppressed.

The method 600 of FIG. 6 can be used independently or in combination with the method 400 of FIG. 4. In some embodiments, the method 400 of FIG. 4 may be used to suppress or null the electromagnetic energy at a first selected receiver antenna element/port, while the method 600 of FIG. 6 can then be used to suppress or null the received signal at another receiver antenna/port, or to further suppress the residue at the first receiver antenna element/port.

Figure 7:
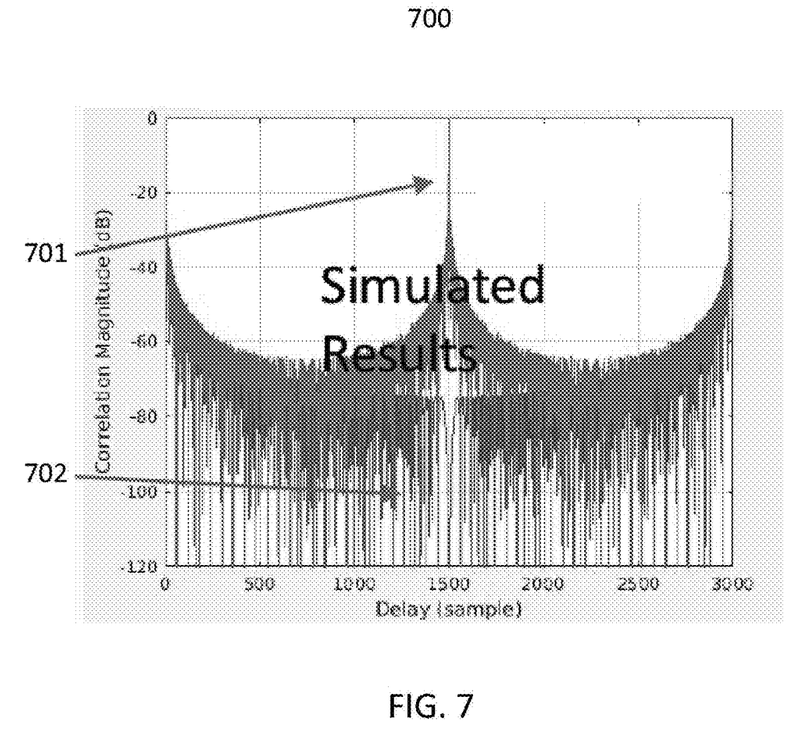
FIG. 7 is an example graph which illustrates an example of improved cosite receiver isolation using the method of FIG. 6.

FIG. 7 is an example graph 700 which illustrates the effectiveness of the method shown in FIG. 6. The graph 700 comes from a simulation of a dual-polarization radar system. The simulated radar system employs simultaneous vertically- and horizontally-polarized transmissions (V and H, respectively). As discussed with respect to FIG. 6, each of the polarized transmissions includes repeated transmit waveforms to which the described chip signals were applied. The upper curve 701 illustrates one of the received signals before performing the cancellation step of block 650 in FIG. 6. The lower curve illustrates the result signal after performing the cancellation step. As is evident from FIG. 7, the received signal was substantially suppressed. This illustrates that it is possible to suppress the H response from the V response, and the V response from the H response.

Linear combination of received signals is another digital signal processing technique which can be used to suppress responses to the transmit signal(s) at the cosite receiver. Consider, for example, a cosite transmitter-receiver system 100, 200 which includes transmit antenna elements T1 and T2 (which send first and second transmit signals) and receive antenna elements R1, R2, R3, and R4. If the first and second transmit signals are known to the receiver (e.g., known pilots or preambles) and use a separability characteristic as discussed herein (e.g., time multiplexing, frequency multiplexing, code multiplexing, etc.), then the receiver can determine propagation channel gains for each transmit/receive pair (i.e., T1/R1, T1/R2, T1/R3, T1/R4, T2/R1, T2/R2, T2/R3, and T2/R4). As discussed herein with respect to the method 400 of FIG. 4, for example, the receiver can then feed this channel state information back to the transmitter for use in determining a set of complex transmission coefficients which can be used to suppress or null the RF energy received at a selected receiver antenna element/port. The complex transmission coefficients may be selected to suppress or null R1, for example. But in that case R2, R3, and R4 may not be suppressed, or if they are, the degree of suppression at R2, R3, and R4 may be less than at R1. Thus, it would be desirable to use digital signal processing techniques to improve suppression at R2, R3, and R4. This can be accomplished via complex weighted linear combining of the signals at R2, R3, and R4. For example, since the receiver knows the complex transmission weights applied to T1 and T2 by the transmitter in order to suppress or null R1 (or can determine those weights based on the channel state information), then the receiver can also determine a receiver-side set of complex weights (using the known transmission weights) which can be used to form linear combinations of the received signals at R2, R3, and R4 to suppress or null those signals, as well, via digital signal processing. Similar techniques can be used for unknown transmit signals by using relative channel state information, as discussed above. Techniques for linearly combining signals are disclosed in U.S. patent application Ser. No. 15/478,179, filed Apr. 3, 2017. Those techniques can be used here as well. Therefore, the entirety of the aforementioned patent application is hereby incorporated by reference.

Although systems and methods are described herein primarily in the context of RF signals, then can equally apply to other types of signals, including signals carried by various types of electromagnetic radiation such as infrared or visible light signals, ultraviolet signals, or x-ray signals. In addition, the concepts described herein can apply to transmission lines or to signals carried by other types of wave phenomena besides electromagnetism, such as acoustic signals, etc. Furthermore, in place of, or in addition to antennas to measure the electric field, alternative sensors could be employed to measure the magnetic field. Thus, the systems described herein can be adapted to operate using different types of signals.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented using, for example, computer software, hardware, firmware, or any combination of software, hardware, and firmware. Software modules can comprise computer executable code for performing the functions described herein. In some embodiments, computer-executable code is executed by one or more general-purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

Multiple distributed computing devices can be substituted for any one computing device illustrated herein. In such distributed embodiments, the functions of the one computing device are distributed such that some functions are performed on each of the distributed computing devices.

While certain embodiments have been explicitly described, other embodiments will become apparent to those of ordinary skill in the art based on this disclosure. Therefore, the scope of the invention is intended to be defined by reference to the claims and not simply with regard to the explicitly described embodiments.

What is claimed is:

1. A method for improving isolation of a receiver from a transmitter, the method comprising:
    transmitting a first plurality of transmit signals from multiple ports of the transmitter, the first plurality of transmit signals being related to one another by a first set of complex weights;
    receiving channel-impaired versions of the first plurality of transmit signals at one or more ports of the receiver, the channel-impaired versions of the first plurality of transmit signals propagating from the transmitter to the receiver via one or more propagation channels;
    analyzing the channel-impaired versions of the first plurality of transmit signals to estimate channel state information for the one or more propagation channels;
    using the channel state information to determine a second set of complex weights which will isolate the receiver from the transmitter when applied to a second plurality of transmit signals that are transmitted by the transmitter, the second set of complex weights varying with frequency; and
    communicating, using the transmitter and the second set of complex weights, with a device other than the receiver, while simultaneously communicating, using the isolated receiver, with a device other than the transmitter,
    wherein the transmitter and the receiver are a cosite pair.

2. The method of claim 1, wherein the receiver estimates the channel state information.

3. The method of claim 2, wherein the receiver sends the channel state information to the transmitter via a feedback communication channel which is distinct from the one or more propagation channels.

4. The method of claim 3, wherein the feedback communication channel is wired.

5. The method of claim 3, wherein the transmitter determines the second set of complex weights.

6. The method of claim 5, further comprising transmitting the second plurality of transmit signals from the multiple ports of the transmitter, the second plurality of transmit signals being related to one another by the second set of complex weights.

7. The method of claim 1, wherein the first plurality of transmit signals comprise pilot or preamble signals which are known by the receiver.

8. The method of claim 1, wherein the first plurality of transmit signals are unknown to the receiver.

9. The method of claim 8, further comprising blindly estimating the channel state information.

10. The method of claim 8, wherein the channel state information comprises relative channel state information.

11. The method of claim 1, wherein the first plurality of signals have a separability characteristic, and wherein the receiver determines the channel-impaired versions of the first plurality of signals using the separability characteristic.

12. The method of claim 11, wherein the separability characteristic comprises time multiplexing, frequency multiplexing, code multiplexing, beam multiplexing, or eigenmode multiplexing.

13. The method of claim 1, wherein the multiple ports of the transmitter are coupled to orthogonally-polarized antenna elements and the second set of complex weights are associated with a plurality of polarization states.

14. The method of claim 1, wherein the multiple ports of the transmitter are coupled to spatially-separated antenna elements having the same or different polarizations.

15. The method of claim 1, wherein the second set of complex weights comprises complex weights for each of a plurality of frequency sub-bands of each of the second plurality of transmit signals.

16. The method of claim 1, wherein the method is iteratively repeated as impairments of the one or more propagation channels change over time.

17. The method of claim 1, further comprising operating the transmitter and the receiver in full duplex mode.

18. The method of claim 1, wherein the first plurality of transmit signals include a repeated transmit waveform, and further comprising:
    applying a first chip signal to a first instance of the repeated transmit waveform at the transmitter; and
    applying a negating second chip signal to a second instance of the repeated transmit waveform at the transmitter.

19. The method of claim 18, further comprising combining the received first instance of the repeated transmit waveform with the received second instance of the repeated waveform at the receiver, thereby at least partially canceling the receiver response to the first plurality of transmit waveforms.

20. A system for improving isolation of a receiver from a transmitter, the system comprising:
    a transmitter configured to send a first plurality of transmit signals using multiple ports, the first plurality of transmit signals being related to one another by a first set of complex weights; and
    a receiver configured to receive channel-impaired versions of the first plurality of transmit signals using one or more ports, the channel-impaired versions of the first plurality of transmit signals propagating from the transmitter to the receiver via one or more propagation channels,
    wherein the system is configured to analyze the channel-impaired versions of the first plurality of transmit signals to estimate channel state information for the one or more propagation channels, wherein the system is further configured to use the channel state information to determine a second set of complex weights which will isolate the receiver from the transmitter when applied to a second plurality of transmit signals that are transmitted by the transmitter, the second set of complex weights varying with frequency, wherein the system is further configured to communicate, using the transmitter and the second set of complex weights, with a device other than the receiver, while simultaneously communicating, using the isolated receiver, with a device other than the transmitter, and wherein the transmitter and the receiver are a cosite pair.

* * * * *